Nov. 6, 1951        R. S. HUNTER        2,574,264
COLOR AND COLOR DIFFERENCE METER
Filed March 4, 1949        3 Sheets-Sheet 1
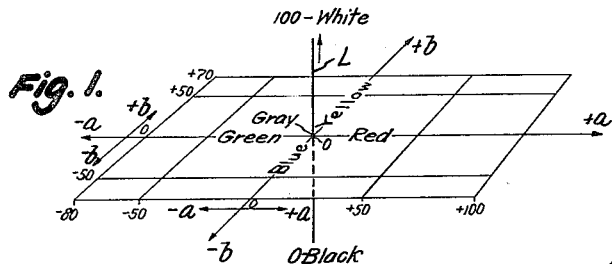
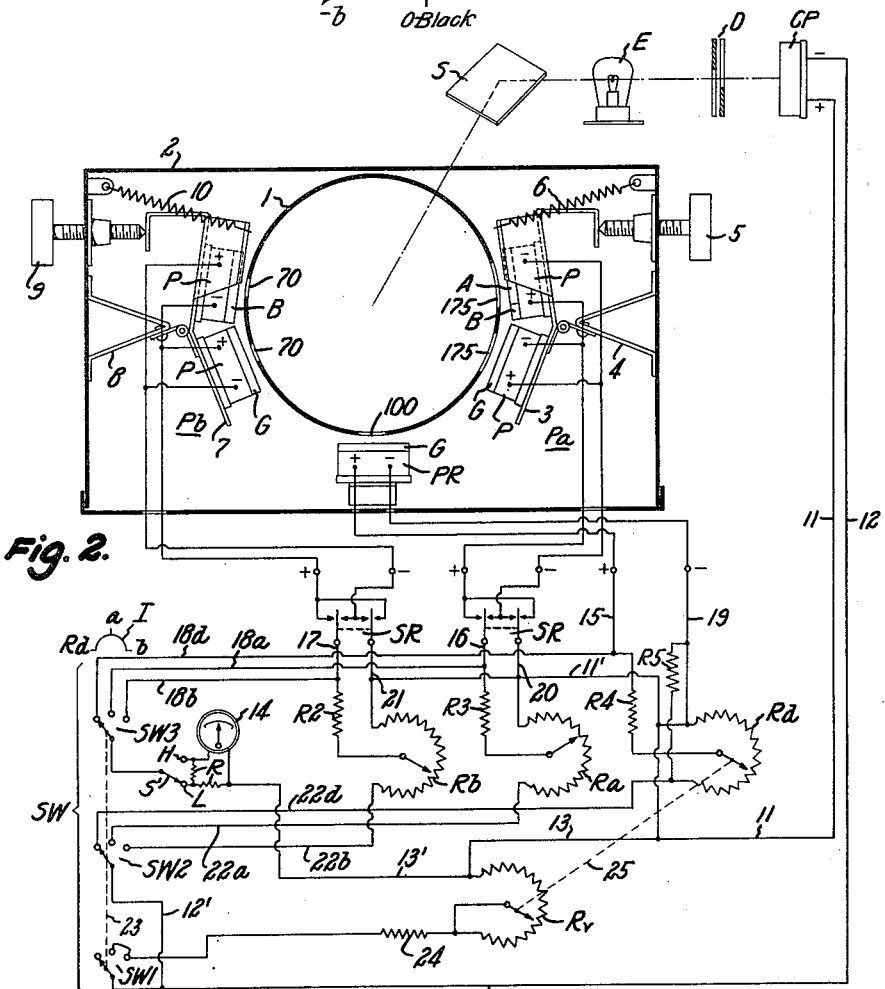
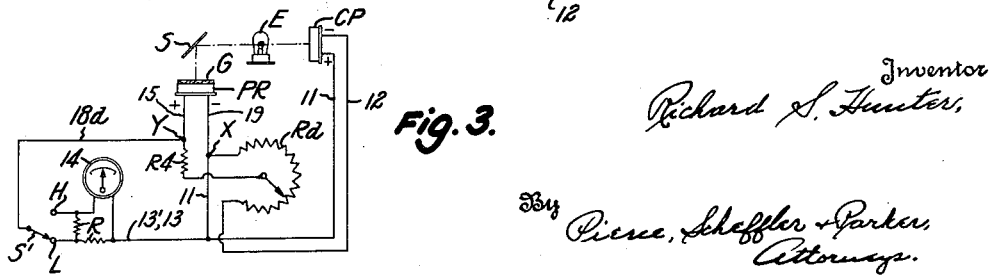
Inventor
Richard S. Hunter,
By Pierce, Scheffler & Parker
Attorneys.

Patented Nov. 6, 1951

2,574,264

UNITED STATES PATENT OFFICE 2,574,264

COLOR AND COLOR DIFFERENCE METER

Richard S. Hunter, Franklin Park, Va., assignor to Henry A. Gardner Laboratory, Inc., Bethesda, Md., a corporation of the District of Columbia Application March 4, 1949, Serial No. 79,603

22 Claims. (Cl. 88—14)

This invention relates to color and color difference meters and more particularly to a photoelectric tristimulus colorimeter for the direct measurement of three numerical values for the identification of a color by the coordinates of a color solid having scales of approximately uniform color-perception spacing.

The physical properties of a color may be measured with a spectrophotometer but the resultant spectrophotometric curve which shows the spectral transmission or apparent reflectance of the sample is not sufficient to identify the psychological properties of the color, i. e. the impressions of an observer who views the color sample. The psychological properties of a color are lightness, hue and saturation, i. e. the latter being the attribute of a perceived surface color which determines the degree of its difference from a gray of the same lightness. Numerical values of these three factors to identify a color may be computed from the three quantities X, Y and Z, the relative amounts of three primary stimuli in the International Commission on Illumination Standard Observer system which are required to color-match the specimen color. It is possible, as I have described in National Bureau of Standards Circular C429, "Photoelectric Tristimulus Colorimetry with Three Filters," July 30, 1942, to measure three values A, G and B, with photocells of the barrier layer type which receive light transmitted through or reflected from the color specimen through amber, green and blue filters respectively; the source-filter-photocell combinations being nearly equivalent spectrally to the ICI Standard Observer, whereby the measured values constitute a close approximation to the tristimulus description of the color on the ICI system. A plotting of the tristimulus values of various colors along three mutually perpendicular axes results in a color solid with non-uniform scales of perceptible color differences but, as described in the circular, ordinates may be computed from the measured A, G and B values to afford uniform scales of units which are approximately equal to the minimum spectral difference which an observer can detect.

An object of the invention is to provide a photoelectric apparatus for the direct measurement of color or of color differences on three scales of units of substantially uniform color-perception difference. An object is to provide a photoeletcric tristimulus colorimeter for the direct measurement of three numerical values for the identification of a color on a perceptively uniform color-difference basis. An object is to provide a color or color difference meter for the direct measurement of three values for the identification of a color in terms of lightness or apparent reflectance and of two chromatic dimensions, or for the direct measurement of the magnitude on the three scales of the color difference between a specimen and a standard. An object is to provide a color and color difference meter including three circuits for the measurement of three values significant of the color of the specimen under investigation; at least one of the measuring circuits including a plurality of photocells which receive light from the color specimen through filters of different spectral transmission.

These and other objects and the advantages of the invention will be apparent from the following specification when taken with the accompanying drawings in which:

Fig. 1 is a schematic diagram of the ordinates of a color solid;

Fig. 2 is a schematic diagram of a color and color difference meter embodying the invention;

Fig. 3 is a simplified equivalent diagram of the measuring circuit established by the adjustment of the switches as shown in Fig. 2;

Figure 4:
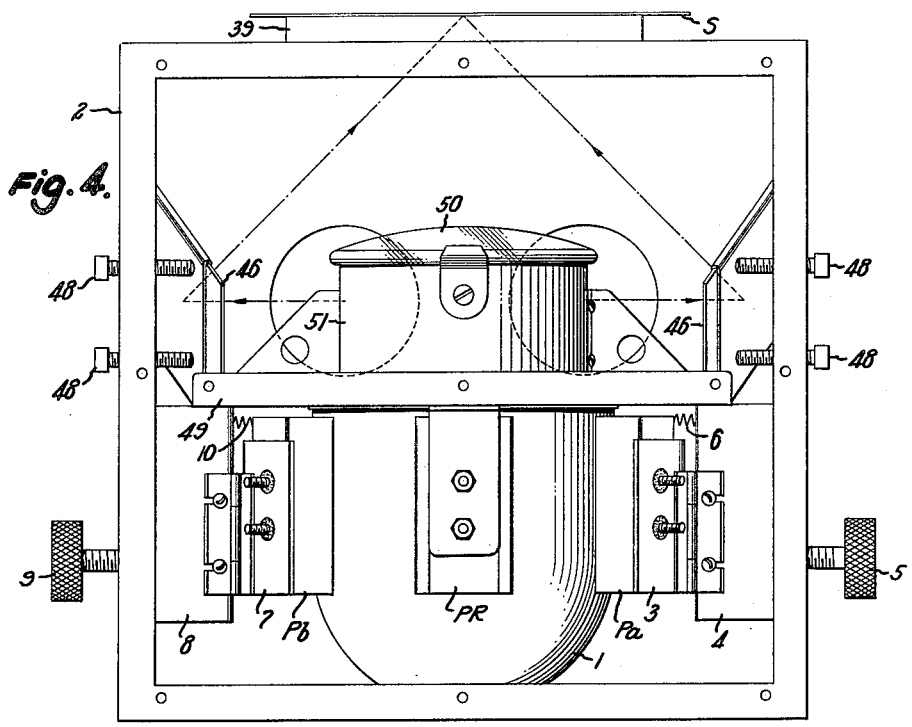
Fig. 4 is a rear elevation of the exposure head as seen with the rear cover removed.
Figure 5:
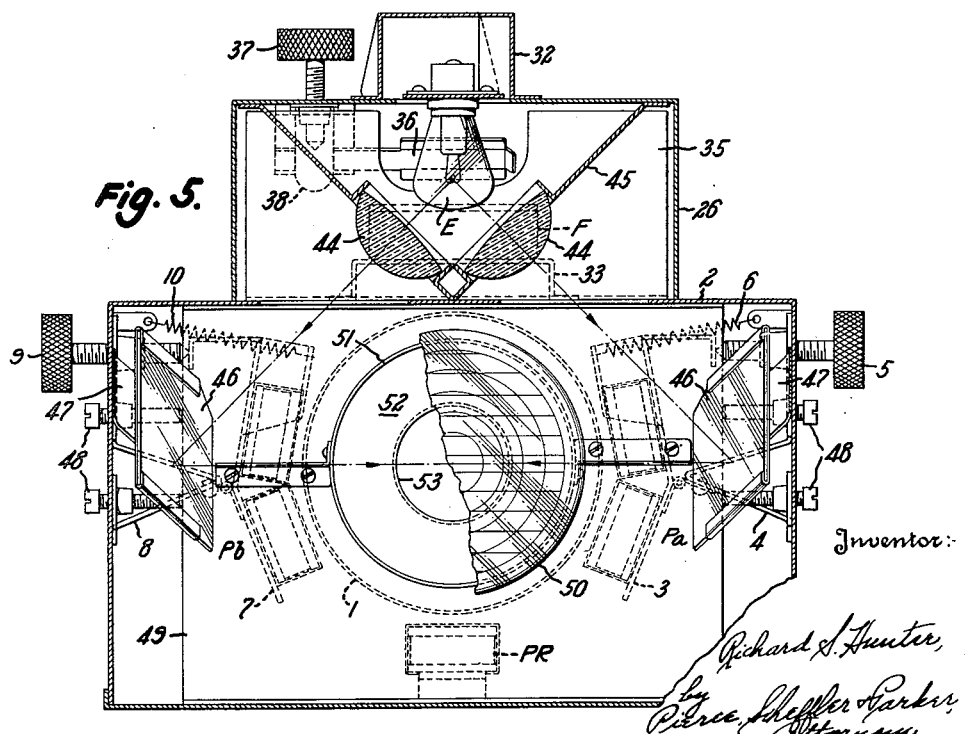
Fig. 5 is a fragmentary horizontal section substantially on a plane through the light source.
Figure 6:
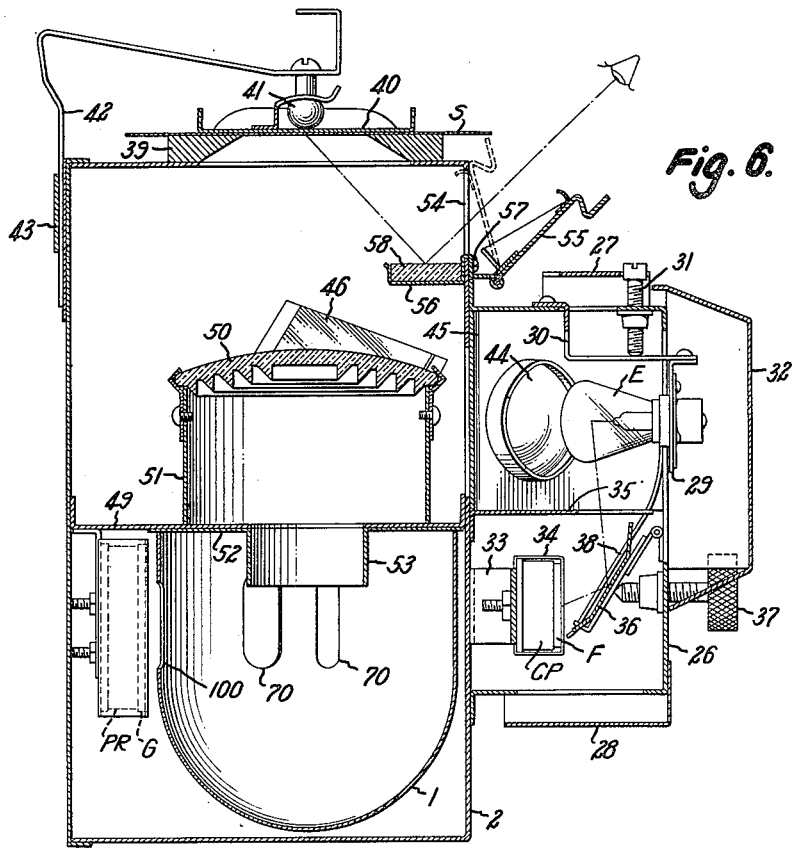
Fig. 6 is a substantially central vertical section through the exposure head.

The invention may be best understood by first considering a color solid constructed on three mutually perpendicular axes; the vertical axis being the neutral gray or lightness axis L, and the horizontal axes $a$, $b$ being significant of the chromaticity of the color. As shown in Fig. 1, the maximum lightness or "white" is 100 units on the vertical axis L, and no lightness or black, is zero. On the $a$ axis, positive values are red, zero is gray, and negative values are green. On the $b$ axis, positive values are yellow, zero is gray, and negative values are blue. Various systems have been proposed, as described in Bureau of Standards Circular C429, for deriving values such as L, $a$ and $b$ from tristimulus colorimetry measurements of X, Y and Z on the ICI Standard Observer system or of A, B and G on the photoelectric systems described in the circular, the new values serving to designate color on coordinate scales which give perceptively nearly uniform measures of stimulus difference. According to the invention, the ordinates for identifying a surface color on such a color solid are not computed from other readings as heretofore but are measured directly. In place of values of lightness L, values of luminous reflectance $R_d$ may be measured since, in specifications for color, it is more usual to specify luminous reflectance than lightness.

The relations between the values of $R_d$, $a$ and $b$, and the reflectance values A, G and B which may be measured, according to prior tristimulus colorimetry, are given by the following equations:

$$R_d = 100G \quad (1)$$
$$a = 175 f_G (0.80A - G + 0.20B) \quad (2)$$
$$b = 70 f_G (G - B) \quad (3)$$

where $$f_G = 0.51 \frac{(21 + 20G)}{(1 + 20G)} \quad (4)$$

The $f_G$ factor is essential for a system of uniform perceptibility units since the relation between perceptual saturation and the reflectance differences in the foregoing equations varies with reflectance $R_d$.

The invention will first be described in detail with respect to an exposure head and a circuit network for measuring the equivalent gray value of a specimen in terms of luminous apparent reflectance $R_d$. With one modification of this apparatus it is possible to obtain direct reading of L, $a$ and $b$ on scales very similar to those of Equations 1 to 4. In terms of the prior tristimulus colorimetry values A, G and B, these similar values of color are given by the equations:

$$L = \frac{100G}{\sqrt{G}} = 100\sqrt{G} \quad (5)$$
$$a = \frac{175}{\sqrt{G}} (0.80A - G + 0.20B) \quad (6)$$
$$b = \frac{70}{\sqrt{G}} (G - B) \quad (7)$$

The square root of the luminous apparent reflectance G is known to correlate well with observers' estimates of the lightness L. In Equations 5 to 7, $$\frac{1}{\sqrt{G}}$$

has thus been substituted for the similar $f_G$ function expressed in Equation 4.

Assuming, for present purposes of description, that light from a constant color-temperature source E illuminates a comparison photocell CP through an energy-adjusting choke or diaphragm D, and also is reflected from a specimen S into a diffusing enclosure 1, the filter-photocell combinations and measuring circuits may be arranged as shown schematically in Fig. 2. The diffusing enclosure 1 is lined inside with magnesium oxide, a non-selective nearly perfect white and is provided with windows or openings of graduated sizes through which filter-photocell assemblies receive light reflected from the test specimen.

A photocell PR with a green filter G is supported on a housing 2 in which the diffusing enclosure 1 is located, and the opening 100 for admitting light to the photocell PR has an area or cross-section, with respect to the openings for passing light to the other photocells, such that the measured value of light incident upon the photocell PR is equal to $R_d$ of Equation 1.

An assembly Pa of two photocells P for measurement of the value $a$ is mounted upon a plate 3 which is hinged to a support 4 secured to the housing 2. The plate 3 may be tilted by a screw 5, in opposition to a biasing spring 6, to adjust the respective photocells in opposite sense with respect to window openings 175 in the wall of the diffusing enclosure. One photocell P of this combination is provided with a green filter G and the other is provided with an amber filter A and a blue filter B, the amber filter A overlying 0.8 of the photocell and the blue filter B overlying 0.2 of the photocell. The photocells are connected in opposition and the net current output of the combination is a function of $$175(0.80A - G + 0.20B)$$

note Equation 2.

A second assembly Pb of two photocells P is mounted on a plate 7 hinged to a support 8 and adjustable by a screw 9 in opposition to a biasing spring 10. One photocell P of this assembly is provided with a green filter G and the other is provided with a blue filter B, the photocells being connected in opposition and exposed to light from the diffusing enclosure 1 through window openings 70.

Although reference numerals 100, 175 and 70 are employed to designate the openings through which light reflected from a specimen is admitted to photocell PR and photocell combinations Pa and Pb, it is to be noted that the relative areas of these openings are not related in the ratio 100:175:70 of the constants of Equations 1, 2 and 3. The areas of the several openings are related in the ratio of these constants, divided, for each window, by the integrated tristimulus response of spectral sensitivity of the several light source-filter-photocell combinations. This departure from window openings of the relative areas of the Equation constants is essential since the light source does not have an equal energy output for all wavelengths, the photocells do not have an equal energy output over the light spectrum, and the different filters do not have the same integrated light transmissions. The factor $f_G$ of Equation 4 is introduced into the measurements of the values $a$ and $b$ by first measuring the value $R_d$ of the apparent reflectance of the test specimen, as will be explained hereinafter.

The comparison photocell CP is illuminated directly by the light source E to develop a constant value comparison current of an order substantially higher than the currents developed by the photocell PR and photocell combinations Pa and Pb which are illuminated indirectly from the light source E by light energy reflected from or transmitted through the specimen under examination. The qualification that the photocell CP is "directly" illuminated by the light source signifies only that the light energy incident upon that photocell is not affected by the specimens under test, and it is not intended to exclude the use of the adjustable diaphragm D or of filters (to be described later) for controlling the magnitude and/or the spectral composition of the light energy reaching the photocell CP from the light source. The current output of photocell CP is therefore a preselected fixed quantity, and the magnitudes of the specimen-determined current outputs of the other photocells may be measured as percentages of that fixed quantity.

Current-comparing measuring circuits which are brought into operation in preselected sequence by switching means are established by an electrical network which will now be described in detail. The positive terminal of the comparison photocell CP is connected by lead 11, 11' to one terminal of each of the several potentiometers $R_d$, $R_a$ and $R_b$, and the other terminal of the comparison photocell CP is connected through lead 12 and jumper 12' to the contact arms of two banks SW1 and SW2 of a multibank three-point switch SW. The positive terminal of the comparison photocell CP is also connected by leads 13, 13' to one terminal of a galvanometer 14 shunted by a resistance network R having spaced points connected to the high and low sensitivity contacts H, L respectively of a sensitivity-adjusting switch S'. The arm of switch S' is connected to the contact arm of a three-point switch SW3 having contacts connected to the positive potential leads 15, 16 and 17 of the photocell or photocell combinations PR, Pa and Pb by leads 18d, 18a and 18b, respectively; such leads being also connected through resistors R4, R3 and R2 to the contact arms of the potentiometers $R_d$, $R_a$ and $R_b$ respectively. The negative potential leads 19, 20 and 21 from the photocell PR and the photocell combinations Pa and Pb are connected to the terminals of potentiometers $R_d$, $R_a$ and $R_b$, to which the positive potential terminal of the comparison photocell CP is connected by leads 11 and 11'. The photocell combinations Pa and Pb each include two photocells P connected in opposition, and the polarity of the leads from these combinations may reverse for different surface colors. Polarity reversing switches SR are therefore provided between the leads from the photocell combinations Pa, Pb and the leads 16, 20 and 17, 21, respectively, of the measuring circuit in which the net current output of each photocell combination is to be opposed to and balanced by a fraction of the current output from the comparison photocell CP.

The contact points of switch SW2 are connected by leads 22d, 22a and 22b to the second terminals of the potentiometers $R_d$, $R_a$ and $R_b$ respectively, and the switch SW2 thus serves to connect the comparison photocell CP across a selected one of the potentiometers according to the adjustment of the switch. The third switch SW1, which is ganged to switches SW2 and SW3 as indicated schematically by the broken line 23, serves to connect a potentiometer $R_v$ across the comparison photocell CP through a resistor 24 to introduce the factor $f_G$ in the measurement of the values $a$ and $b$, respectively. The contact arm of potentiometer $R_v$ is connected to and actuated by the contact arm of the potentiometer $R_d$ through a mechanical connection indicated schematically by the broken line 25. For equal photocell current response for measurements of the three values, the potentiometer $R_d$ is shunted by a resistor $R_5$ of a fixed value equal to the maximum value of potentiometer $R_v$.

The values $R_d$, $a$ and $b$ are essentially reflectance or transmission values and they are measured, as were the reflectance values A, B and G in the prior tristimulus photoelectric colorimetry systems, in terms of the fractions of the current output of the comparison photocell CP which exactly balance the current outputs of the photocell PR and photocell combinations Pa, Pb respectively. These current balances are obtained by adjusting the contact arms of the potentiometers $R_d$, $R_a$ and $R_b$ respectively, to bring the pointer of galvanometer 14 to its zero center position, these balance adjustments being made in succession with the contact arms of the switch bank SW first set at the first point $R_d$ of the indicator scale I, and then at points $a$ and $b$.

The circuit connections established when the switch bank SW is adjusted, as shown in Fig. 2, for measurement of the luminous reflectance value $R_d$, are redrawn in simplified form in Fig. 3. Switch S' is normally set at contact L for low galvanometer sensitivity and is moved to the high sensitivity contact H only after the contact arm of potentiometer $R_d$ is adjusted to obtain an approximate balance. The comparison photocell CP is connected directly across the terminals of the potentiometer $R_d$ by leads 11, 12, the positive lead 11 being connected to the potentiometer terminal X to which the negative lead 19 from the photocell PR is connected. The contact arm of the potentiometer is connected through resistor R4 to the positive lead 15 from photocell PR at point Y which, through lead 18d, is connected to the sensitivity control switch S' of the galvanometer 14. The other terminal of the galvanometer 14 is connected through leads 13', 13 and 11 to point X. The galvanometer is thus connected across points X and Y, and responds to any voltage difference between these points. The contact arm of potentiometer $R_d$ is adjusted to bring the galvanometer needle substantially to zero, and switch S' is then adjusted to the high sensitivity contact for the final setting of the contact arm to obtain a voltage balance across points X and Y. The contact arm is adjustable by an accurately graduated, and preferably a ten-turn dial, not shown, from which the value $R_d$ may be read.

The total resistance of the potentiometer $R_d$ is small in comparison with the resistance R4 in series with the contact arm, and the potential drop between the zero or X end and the sliding contact supplies a small current through the high resistance R4 to balance the current from the measuring photocell PR. In one embodiment of the invention, the potentiometers have a resistance of 100 ohms, and the resistors in series with the sliding contact arms each have a resistance of 8000 ohms. With these resistance relationships, the balancing currents derived from the potentiometers are proportional to the effective variable resistances of the potentiometers within one or two tenths of a percent of the angular adjustments of the sliding contacts as indicated by the dial settings.

In the setting of the sliding contact arm of potentiometer $R_d$ to measure the luminous reflectance $R_d$ of a specimen, the contact arm of potentiometer $R_v$ is also adjusted, but this adjustment has no effect upon the measurement of the value $R_d$. Upon shifting the switch SW for a measurement of the value $a$ or $b$, the potentiometer $R_v$ is shunted across the comparison photocell CP by the switch SW1. The measuring circuits for determining the chromaticity values $a$ and $b$ are essentially circuits similar to the simple comparison circuit of Fig. 3, but modified by shunting a variable portion of the comparison photocell current around the measuring potentiometer by the potentiometer $R_v$, thereby to introduce the factor $f_G$ which varies with the lightness L or luminous reflectance $R_d$ of the specimen. The relative values of the resistances of the potentiometer $R_v$ and resistor 24 determine the value of the factor $f_G$ as a function of the setting of the potentiometer $R_d$. When potentiometer $R_v$ has a total resistance of 100 ohms and resistor 24 has a resistance of 4 ohms, the combination develops a factor $f_G$ of the value indicated by Equation 4. The circuits for measuring the values $a$ and $b$ also include the polarity reversing switches SR to obtain a net output from the photocell combinations Pa and Pb of a polarity opposite to that developed by the comparison photocell CP.

It is of course essential that the light source or lamp E be operated from a constant-voltage source to eliminate errors from changes in the color temperature of the light source. A fully charged storage battery or an electronically controlled constant-voltage source may be employed, but the particular design of the voltage source for energizing the light source E forms no part of the present invention.

The sensitive galvanometer 14 has a scale graduated in small units, for example millimeters, so that at any level of luminous apparent reflectance or lightness the deflections of the galvanometer pointer are proportional to the magnitude of color differences. The described apparatus may therefore be employed for the measurement of color differences by setting the potentiometers $R_d$, $R_a$ and $R_b$ to the several known values of a standard color, and then placing an unknown specimen S in position to pass light from source E into the diffusing chamber 1. On adjusting the multiple bank switch SW in turn to its three measuring positions, the several indications of the galvanometer 14 show the magnitude, on the three scales, of the color difference between the unknown specimen and the standard.

The apparatus is conditioned or calibrated for measurement of color or of color difference values by placing a white standard specimen upon a specimen-supporting plate, for example a standard white having known values of $R_d=73.0$, $a=-1.2$ and $b=1.3$. The gang switch SW is set to its first point for a measurement of luminous reflectance $R_d$ and the light energy incident upon the comparison photocell CP is adjusted, by adjusting the diaphragm D, to obtain a balance or zero deflection at galvanometer 14 with the contact arm of potentiometer $R_d$ set at the known value of $R_d=73.0$. The switch SW is then adjusted for measurement of the value $a$, the potentiometer $R_a$ is set at the known value $a=-1.2$, and the photocell combination Pa is adjusted angularly by the screw 5 to obtain a balance at the galvanometer. The switch SW is then set for measurement of the value $b$, the known value is set on potentiometer $R_b$, and the photocell combination is adjusted by screw 8 to obtain a balance.

The amber-blue ratio of the photocell P of the combination Pa must then be checked for accuracy of the relative ratios of the amber and blue filter components. A standard lavender-blue specimen having a low $a$-value, for example $Rd=16$ and $a=-0.4$, is then placed on the plate 39, the known $R_d$ setting is made on potentiometer $R_d$ and switch SW is adjusted for measurement of the value $a$. If the reading of potentiometer $R_a$ at a balance is more negative than the known value of $a=-0.4$, the blue component must be increased and the amber component must be reduced. If the measured reading is more positive than $-0.4$, the blue component must be reduced and the amber component must be increased. The desired ratio of the blue and amber filter components is determined by a series of successive approximations since, for each change in their relative areas, the apparatus must be again standardized on a known white specimen before checking the accuracy of the blue-amber ratio.

The mechanical assembly of and panel arrangement for the adjustable electrical elements, switches and potentiometers, are not important features of the invention but, in general, it is preferred to locate the measuring system in a box or housing which may be placed on a laboratory table or workbench and which serves as a support for the housing 2 within which the light source E, the diffusing chamber 1 and the several photocells are located.

The housing 2 is a sheet metal box with a smaller box or sub-housing 26 detachably secured to the front wall thereof to house the light source or lamp E and the comparison photocell CP. The upper and lower walls of sub-housing 26 are provided with ventilating openings across which light-intercepting baffles 27, 28 respectively are supported in spaced relation. The socket or mounting plate 29 for the lamp bulb E is carried by one end of a resilient metal strap 30, the other end of the strap being secured to the top wall of the sub-housing 26, whereby the position of the lamp filament may be adjusted vertically by a screw 31 which is threaded through the upper wall to contact the strap 30. A removable domed cover 32 for affording access to the bulb E is secured to the sub-housing 26.

The comparison photocell CP is supported within the lower portion of the housing 26 by a bracket or strap 33 mounted on the front wall of the housing 2, and a heat-absorbing filter F is held over the photocell by a resilient clamping frame 34 having side flanges which snap over the sides of the photocell. A partition plate 35 shields the photocell CP from direct illumination by the lamp bulb E, and the forward edge of the plate 35 is deeply notched for ventilation and to pass a beam of rays from bulb E to a mirror or polished metal plate 36 for reflection to the photocell. The mirror 36 is hinged to the front wall of housing 26, and is adjustable angularly by a screw 37 in opposition to a biasing spring 38 to control the light energy reaching the photocell; this adjustment of the mirror 36 being equivalent to the energy-control adjustment of the diaphragm D of Fig. 2.

An apertured plate 39 of a black, matte-surfaced plastic is secured over an opening in the upper wall of the housing 2 to support a specimen S which is to be measured for color or for color difference from a known standard. The top surface of the plate 39 is accurately planar, and the specimen S may be resiliently clamped flat upon the supporting plate 39 by a flat plate 40 having a ball-and-socket connection 41 to a resilient supporting arm 42 which is bent downwardly for insertion in a socket formed by a strap 43 welded to the back wall of the housing 2.

Lenses 44 are supported by a V-shaped plate 45 to direct light beams from lamp E into the housing 2 for reflection by mirrors 46 toward the opening of the specimen-supporting plate 39. The mirrors are mounted on the opposite side walls of the housing 2 by resilient metal straps 47 and are angularly adjustable by pairs of screws 48 to direct light beams towards the specimen S from opposite directions at angles of 45°. The position of the light bulb E is adjustable vertically with respect to the lenses 44 by means of the screw 31, to control the points of impact of the light beam upon the mirrors 46. The diffusing chamber 1 is supported on and below a transverse wall 49 within housing 2, and light reflected downwardly from the specimen S reaches the diffusing chamber through a fluted lens 50 and an upper cylindrical chamber 51. The upper wall of the diffusing chamber 1 is a plate 52 with a central opening formed by a short cylindrical flange 53. Light rays incident upon the fluted lens 50 are focused to pass through the cylindrical passage or flange 53 to strike the lower hemispherical wall of the diffusing chamber. The inner walls of the diffusing chamber 1 are coated with magnesium oxide to promote diffuse reflection, but the walls of the upper chamber 51, the inner surfaces of the housings 2 and 26 are black matte surfaces to prevent reflection of light.

The specimens to be measured for surface color may be sheets or plates of the same or of different colors in different areas, for example they may be sheets of paper upon which pictures are printed in color. To facilitate the location of the area of interest in the path of the light beams reflected from the mirrors 46, the front wall of the housing 2 is provided with an opening 54 which is normally covered by a door or closure 55. The door 55 is hinged to a metal plate 56 which is secured to the front wall of housing 2 by screws 57 and which supports a dark mirror or black glass reflector 58. When door 55 is opened, the operator can see an image of the specimen S in the mirror 58, and thereby can bring any desired portion of the specimen into position for measurement.

Figure 7:
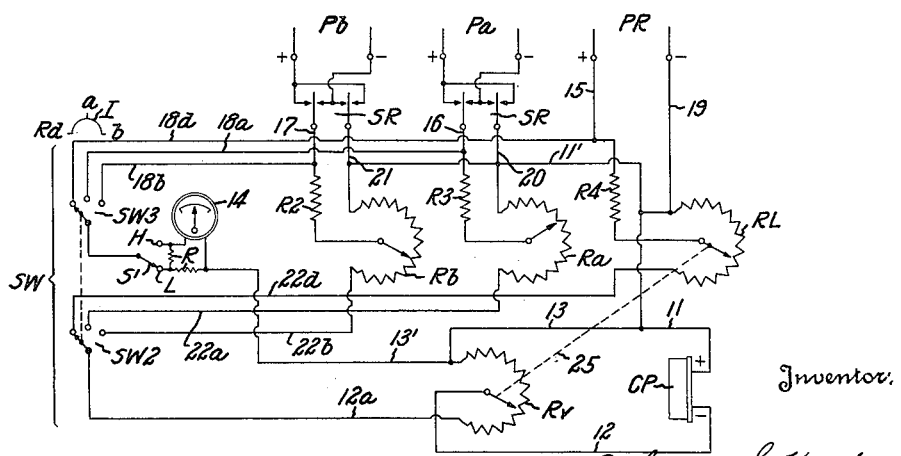
Fig. 7 is a fragmentary circuit diagram of comparison circuits for measuring the lightness L of specimens.

The same exposure head may be employed for measurement of the lightness L by a simple change in the electrical connections of the comparison photocell CP into the measuring network. As shown in Fig. 7, the positive terminal of the photocell CP is connected, as in the Fig. 2 circuit, to one terminal of potentiometers $R_L$, $R_a$ and $R_b$ by leads 11, 11', and to one terminal of the potentiometer $R_v$ by lead 13. Potentiometer $R_L$ is the identical potentiometer $R_d$ of the Fig. 2 circuit but, for convenience and clarity in description, it is identified by character $R_L$ in Fig. 7. The negative lead 12 is connected to the contact arm of potentiometer $R_v$ in the Fig. 7 circuit, resistor $R_s$ and switch SW1 are omitted, and the second terminal of potentiometer $R_v$ is directly connected to the contact arm of switch SW2 by a lead 12a. With this new circuit arrangement, the switch SW2 connects the potentiometer $R_v$ across the potentiometer $R_L$ when the switch is set for a measurement with that potentiometer and, as in the Fig. 2 circuit, connects the potentiometer $R_v$ across potentiometer $R_a$ or $R_b$ at the other switch positions.

The potentiometers $R_L$ and $R_v$ are adjusted simultaneously since they are the same 2-gang 100 ohm potentiometer assembly which is included in the Fig. 2 circuit, and inspection of the Fig. 7 measuring circuit indicates that the counterclockwise displacement of the contact arm of potentiometer $R_L$ from its lower or "100" position to balance the current output of the photocell PR for any given specimen will be substantially less than the displacement of the contact arm of potentiometer $R_d$ of Fig. 2 for the same specimen. One-half of the current output of the comparison photocell CP flows continuously through potentiometer $R_d$ of the Fig. 2 circuit, whereas the comparison photocell current through potentiometer $R_L$ of the Fig. 7 circuit varies with the ganged adjustment of the contact arms of potentiometers $R_L$ and $R_v$, being one-half when the contact arms are set at the "100" or lower terminals (as seen in Fig. 7) and zero when the contact arms are set at their respective upper terminals. Quantitatively, the electrical characteristic of the measuring circuit of Fig. 7 is, with respect to the Fig. 2 measuring circuit and for any given specimen, that the potentiometer $R_v$ of Fig. 7 introduces the factor $$\frac{1}{\sqrt{G}}$$

to increase the "balance" setting of the potentiometer $R_L$ to $$\frac{R_d}{\sqrt{G}}$$

when $R_d$ was the setting of potentiometer $R_d$ of the Fig. 2 circuit in measuring the luminous apparent reflectance of the same specimen. In other words, the light index L of the specimen as measured with the Fig. 7 circuit is:

$$L = \frac{R_d}{\sqrt{G}} = \frac{100G}{\sqrt{G}} = 100\sqrt{G}$$

Since the lightness value L is measured first and the setting of potentiometer $R_v$ is not changed during the subsequent measurement of the chromaticity values $a$ and $b$, the factor $$\frac{1}{\sqrt{G}}$$

appears in the measured chromaticity values, note Equations 6 and 7, in place of the factor $f_G$ of Equations 2 and 3 to take account of the perceptual variation of color with luminous apparent reflectance or lightness.

The diffusing chamber may well be omitted when the specimens to be measured or compared are all of the same general surface configuration. The function of the diffusing chamber is to eliminate variations in magnitude which would arise from different geometrical compositions of the surfaces from which light is reflected towards the photocells. The measuring methods of the invention may be employed, by appropriate location of the light source with respect to the specimen, for the evaluation of volume colors for transmission measurements or for the evaluation of the colors of self-luminous objects for measurements of radiant flux.

The invention is not limited to the particular embodiment herein shown and described, and various modifications which may occur to those familiar with the design and construction of photoelectric color-measuring apparatus fall within the spirit and scope of the invention as set forth in the following claims.

I claim:

1. In a color and color difference meter, means for supporting a specimen, a comparison photocell, a light source for illuminating a specimen and said comparison photocell, a diffusion chamber receiving light from a specimen positioned on said specimen supporting means, a plurality of photocell means provided with filters of different tristimulus characteristics, said diffusion chamber being provided with openings through which light is transmitted to the several photocell means, and a measuring circuit network for measuring the equivalent gray value and the chromaticity of the specimen on three scales of substantially uniform perceptibility; said measuring circuit network including switch means adjustable to establish a desired one of three measuring circuits which each include a selected photocell means and a potentiometer adjustable to balance the current output of the selected photocell means by a fraction of the current output of said comparison photocell; each potentiometer having indicating means including a scale graduated in 100 units, and the relative areas of the several openings being different and so related that the scale reading of each potentiometer at balance condition is a numeral value, on a scale of substantially uniform perceptibility, of a color attribute of the specimen.

2. In a color and color difference meter, the invention as recited in claim 1, wherein the measuring circuit established by said switch means for measuring the equivalent gray value of a specimen includes a photocell means covered by a green filter.

3. In a color and color difference meter, the invention as recited in claim 2, wherein said measuring circuit established by said switch means for measuring the equivalent gray value of a specimen includes circuit elements by which the adjustment of the contact arm of the potentiometer of that measuring circuit to obtain a current balance is a function of G, where G is luminous apparent reflectance of the specimen as measured by a photocell provided with a green tristimulus filter.

4. In a color and color difference meter, the invention as recited in claim 2, wherein said measuring circuit established by said switch means for measuring the equivalent gray value of a specimen includes circuit elements by which the adjustment of the contact arm of the potentiometer of that measuring circuit to obtain a current balance is a function of $\sqrt{G}$, wherein G is luminous apparent reflectance of the specimen as measured by a photocell provided with a green tristimulus filter.

5. In a color and color difference meter, the invention as recited in claim 1, wherein one of said photocell means includes a pair of photocells connected in current opposition, and the filters of said photocells have different tristimulus color transmission characteristics.

6. In a color and color difference meter, the invention as recited in claim 5, wherein the filter means over one cell includes a pair of filters of different color transmission characteristics.

7. In a color and color difference meter, the invention as recited in claim 5, wherein said filter means includes amber, green and blue filters.

8. In a color and color difference meter, the invention as recited in claim 5, wherein said filter means comprises a green filter over one photocell and a blue filter over the second photocell.

9. In a color and color difference meter, the invention as recited in claim 5, wherein said filter means comprises a green filter over one photocell and a combination amber and blue filter over the other photocell.

10. In a color and color difference meter, a housing including means for supporting a constant color-temperature specimen, a light source for illuminating a specimen placed on said supporting means, a comparison photocell directly illuminated by said light source to develop a constant value comparison current, a plurality of photocell means positioned to receive light from a specimen illuminated by said light source, filters of different tristimulus transmission characteristics over the individual photocell means, one photocell means having thereover a green filter conditioning said photocell means to develop a current proportional to the apparent reflectance or equivalent gray value of the specimen under test and a second photocell means having thereover filters of different tristimulus characteristics conditioning said second photocell means to develop a current proportional on a scale of uniform perceptibility units to a chromaticity value of the specimen under test, and a measuring circuit network for measuring the current outputs of the individual photocell means in terms of the fractions of the constant value comparison current which equal and are of opposite polarity to the current outputs of the individual photocell means; said measuring circuit network including a potentiometer individual to each photocell means and each including a resistance element and contact arm adjustable along the same, circuit elements connecting each photocell means between one end of its potentiometer resistance and the contact arm thereof, circuit means for establishing through the individual potentiometer resistance elements currents developed by said comparison photocell, and indicating means including a relatively movable graduated scale and index elements individual to said potentiometers and actuated by displacement of the contact arms thereof, whereby adjustment of said contact arms to balance the opposing polarity currents of said comparison photocell and said photocell means results in indicated scale values of the apparent reflectance and of a chromaticity value of the specimen under test on scales of uniform perceptibility units.

11. In a color and color difference meter, the invention as recited in claim 10, wherein said second photocell means comprises a pair of photocells connected in opposition, and filters of different color transmission characteristics over the respective photocells.

12. In a color and color difference meter, the invention as recited in claim 11, wherein a blue filter is over one photocell and a green filter is over the other photocell.

13. In a color and color difference meter, the invention as recited in claim 12, wherein said blue filter extends over a portion of one photocell, and an amber filter extends over another portion of the same photocell.

14. In a color and color difference meter, the invention as recited in claim 10, in combination with a mirror supported on said housing for viewing a specimen on said supporting means, said housing having an opening for viewing said mirror, and a door movable to close said opening.

15. In a color and color difference meter, the invention as recited in claim 10, in combination with adjustable means controlled by adjustment of the tap of the potentiometer of said first photocell means to vary the current established through the resistance element of the potentiometer of the second photocell means as a function of the apparent reflectance of the specimen under test as determined by the current output of said first photocell means.

16. In a color and color difference meter, the invention as recited in claim 15, wherein said adjustable means comprises an additional potentiometer including a resistance element and a contact arm adjustable along the same, means mechanically connecting the contact arms of said additional potentiometer and said potentiometer individual to said first photocell means, the contact arm of said additional potentiometer being grounded upon one end of the resistance element thereof; and said circuit means includes circuit elements for connecting said comparison photocell across the resistance element of said additional potentiometer, and circuit elements for connecting the resistance element of the potentiometer individual to said second photocell means across the resistance element of said additional potentiometer.

17. In a color and color difference meter, the invention as recited in claim 10, wherein said circuit means includes switch means adjustable to establish a current from said comparison photocell through a desired one of the potentiometers individual to said photocell means.

18. In a color and color difference meter, the invention as recited in claim 10, wherein said circuit elements connecting said second photocell means to its potentiometer include a polarity reversing switch.

19. In a color and color difference meter, a light source of constant color-temperature for illuminating a specimen, a diffusion chamber into which light is transmitted from the specimen, a comparison photocell directly illuminated by said light source, said diffusion chamber having a plurality of openings through the wall thereof, a photocell covered by a green filter receiving light through one of said openings and thereby developing a current output proportional to the luminous reflectance of the specimen, measuring means to measure the current output of said photocell as a fraction of the current output of said comparison photocell, photocell means positioned adjacent said diffusing chamber for illumination through another opening thereof, filter means over said photocell means and including sections of different tristimulus characteristics, and a measuring circuit for measuring the current output of said photocell means as a fraction of the current output of said comparison photocell, said measuring circuit including a potentiometer comprising a resistance element and a tap adjustable along the same, circuit means for establishing through said resistance element by said comparison photocell a current dependent upon the luminous reflectance of the specimen as determined by adjustment of said measuring means, circuit elements connecting said photocell means between one end of and the tap on said resistance element to establish between said end and tap a current of opposite polarity to that established by said comparison photocell, and a galvanometer for indicating by a zero reading an equality of the opposed polarity currents established in said potentiometer resistance element by said comparison photocell and said photocell means.

20. In a color and color difference meter, the invention as recited in claim 19, wherein said circuit means includes a second potentiometer having a resistance element connected across said comparison photocell and a tap adjustable along said resistance element and grounded on one end thereof, circuit elements connecting one end and the tap of said second potentiometer across the resistance element of the first potentiometer, and means operable by adjustment of said measuring means to measure luminous reflectance to adjust the tap of said second potentiometer along the resistance element thereof, thereby to vary the comparison photocell current through the resistance element of said first potentiometer as a function of the measured luminous reflectance of the specimen.

21. In a color and color difference meter, the invention as recited in claim 19, wherein said photocell means comprises a pair of photocells connected in current opposition and provided with filters of different color transmission characteristics.

22. In a color and color difference meter, the invention as recited in claim 19, wherein a green filter is arranged over one of said photocells, and a combination amber-blue filter is arranged over the other photocell.

RICHARD S. HUNTER.

REFERENCES CITED

The following references are of record in the file of this patent:

UNITED STATES PATENTS

| Number | Name | Date |
| --- | --- | --- |
| 1,971,317 | Sheldon et al. | Aug. 21, 1934 |
| 2,015,675 | Hays | Oct. 1, 1935 |
| 2,064,517 | Brice | Dec. 15, 1936 |
| 2,114,867 | Wilson | Apr. 19, 1938 |
| 2,159,181 | Ryder | May 23, 1939 |
| 2,244,826 | Cox | June 10, 1941 |
| 2,245,034 | Harrison | June 10, 1941 |
| 2,375,966 | Valensi | May 15, 1945 |
| 2,417,321 | Park et al. | Mar. 11, 1947 |
| 2,471,750 | Hunter | May 31, 1949 |